June 16, 1964   H. L. WINSTEAD   3,137,396
APPARAUS FOR THE INSPECTION AND FEEDING
OF TOBACCO ONTO A REDRIER
Filed June 30, 1960   9 Sheets-Sheet 1

Fig. 1

INVENTOR
Harvey L. Winstead

BY
ATTORNEY

June 16, 1964  H. L. WINSTEAD  3,137,396
APPARAUS FOR THE INSPECTION AND FEEDING
OF TOBACCO ONTO A REDRIER
Filed June 30, 1960  9 Sheets-Sheet 2

Fig. 2

INVENTOR
Harvey L. Winstead

BY *[signature]*
ATTORNEY

Fig. 6

INVENTOR
Harvey L. Winstead

June 16, 1964

H. L. WINSTEAD

3,137,396

APPARAUS FOR THE INSPECTION AND FEEDING
OF TOBACCO ONTO A REDRIER

Filed June 30, 1960

INVENTOR
Harvey L. Winstead
BY
ATTORNEY

June 16, 1964

H. L. WINSTEAD

3,137,396

APPARAUS FOR THE INSPECTION AND FEEDING
OF TOBACCO ONTO A REDRIER

Filed June 30, 1960

INVENTOR
Harvey L. Winstead

BY

ATTORNEY

June 16, 1964  H. L. WINSTEAD  3,137,396
APPARAUS FOR THE INSPECTION AND FEEDING
OF TOBACCO ONTO A REDRIER
Filed June 30, 1960  9 Sheets—Sheet 9

INVENTOR
Harvey L. Winstead
BY
ATTORNEY

United States Patent Office 3,137,396
Patented June 16, 1964

3,137,396
APPARATUS FOR THE INSPECTION AND FEEDING OF TOBACCO ONTO A REDRIER
Harvey L. Winstead, Davis Drive, Farmville, N.C.
Filed June 30, 1960, Ser. No. 39,939
11 Claims. (Cl. 214—5.5)

This invention relates to the handling of commodites and to the physical equipment by which such handling is accomplished, and particularly to the handling of tobacco between the time of the harvesting and the utilization of the same in the manufacture of the several products in which it is employed.

The invention relates specifically to the handling and inspection of tobacco immediately prior to its use in the manufacture of tobacco products in order to remove undesirable stem and leaf portions and chaff and to make available tobacco of greater uniformity and higher quality for use in the manufacture of various tobacco products.

In the harvesting and curing of tobacco the quality and uniformity of the tobacco is impaired by the presence of inferior or undesirable leaves, chaff, or other substances and efforts have been made to improve the quality of the tobacco by the inspection and removal of such quality impairing substances. This has been undertaken by inspection of the tobacco as it has been caused to travel in a generally horizontal path at a relatively high speed. Because of the quantity of tobacco handled and the high speed of travel, it has not been possible to inspect thoroughly or adequately leaves which preferably should be inspected individually, or to obtain access to and remove leaves of poorer or better quality, which interfere with the uniformity of the end product, so that the quality of tobacco heretofore made available for use in manufacture has been below that desired.

It is an object of the invention to provide equipment for performing the dual function of facilitating the transfer of the leaves of tobacco onto a redrier and for supporting the leaves on such equipment and causing them to travel at a slow speed in a manner that they can be substantially individually inspected from opposite sides to insure the removal of undesirable leaves or the like and the uniformity and improvement of the quality of the tobacco.

Another object of the invention is to provide conveyor means for moving sticks of tobacco in a manner to facilitate substantially individual inspection of the leaves of tobacco from opposite sides as they are conveyed and with means for automatically transferring the sticks of tobacco onto a conveyor and a redrier.

Another object of the invention is to transfer tobacco onto a redrier, to provide for the individual inspection of the leaves on both sides during such transfer, and to control the speed of handling in synchronization with the redrying machine regardless of the starting stopping and variation of the speed of the latter.

Other and further objects of the invention will be apparent from the following description taken in conjunction with the accompanying drawings, wherein.

Briefly stated the present invention is apparatus for the inspection and loading of tobacco onto a redrier and by means of which the leaves of tobacco can be substantially individually inspected. The apparatus includes a frame in which are mounted a pair of upright generally rectangular conveyors in spaced parallel relation, each of the conveyors having spaced dependent arms pivoted thereto with cups at their lower ends spaced apart the length of a conventional tobacco stick for receiving and supporting the latter when filled with tobacco. The cups are caused to move simultaneously and at the same speed in order that the stick of tobacco may be carried slowly along for inspection. The ends of the sticks of tobacco are placed in the spaced cups near the bottom and on the exterior of the machine upon the upwardly moving conveyor chains and with the tobacco visible for inspection from both sides. After reaching the extent of its upward movement the tobacco travels over a workman's protecting roof, carrying fluorescent or other adequate lighting means, and the tobacco is carried downwardly on the opposite side for inspection by another workman of the leaves on the opposite side of the stick. The return of the conveyor chains to the first side is covered by a housing to prevent engagement thereof by workmen. After the sticks of tobacco are inspected the second time means is provided for transferring them onto a redrier such means includes brackets, a conveyor, and a timing sprocket and microswitches by means of which the operation of the inspection and transfer conveyors are controlled in synchronism with or subject to the starting stopping and operation of the redrier.

The machine comprises a pair of parallel upright generally rectangular conveyor chains 10 spaced apart a proper distance to receive opposite ends of a tobacco stick 11 loaded with hands of tobacco 12 from a rack 13 by an operator 14. The sides or the upright portions of the conveyor chains 10 are exposed and the lower runs or cross portions of the rectangular conveyor chains are mounted in a protective housing 15.

Each of the spaced conveyor chains is carried on individual corner sprockets 16 mounted on a generally rectangular frame 17 with the adjacent sides of each of the chains provided with depending cups 18 pivoted by screws 19 to mounting blocks 20 attached by bolts or screws 21 through a link or turned down portion 22 of links 23 on the conveyor chain 10.

The conveyor chains include rollers 24 which at the top of the structure ride upon the horizontal portions of tracks 25 of angular cross section. To counter balance the weight of the tobacco sticks on the cups 18, opposite the first turned over portion of the chain is attached a block 26 into which is threaded a stud 27 on which is mounted a roller 28 opposite the track forming troughs 29 carried by horizontal bars 30, above and below the roller 28 and on four sides adjacent the rectangular conveyor and serving to guide the conveyor chains.

In order to prevent each cup 18 from swinging on its pivot 19 a roller 31 is mounted on a bolt or stud 32 and riding between uprights 33 at opposite sides of the machine. Thus the sticks of tobacco supported by the opposed cups 18 may be viewed and engaged by an operator, but due to the rollers 31 and the retaining members 33 appreciable swinging will be avoided.

Sticks of tobacco unloaded by the operator 14 (FIG. 1) will be placed in the pivotally supported cups 18 from the outside of the conveyor, one at each end of the stick, and will be loaded onto the conveyor chain 16 and into the cups at the lowermost position from which they will travel upwardly to allow the operator to give a cursory inspection and to straighten the hands of tobacco at the side on which she is stationed. An operator 34 may inspect the opposite side of the tobacco as it moves upwardly, until the sticks of tobacco are out of reach, whereupon they travel on the track 25 over the sprockets 16 and horizontally across the upper portion over the remote pair of sprockets 16 and down the opposite or far side, during which latter motion an operator 35 may inspect the tobacco on the opposite side of the stick.

In order to protect the operators 34 and 35 against falling tobacco or sticks, a horizontal platform 37 may be mounted upon angular supports 38 attached to the uprights 39 by bolts 40. On the under side of the platform 37 are mounted spaced fluorescent or other lights 41, to provide adequate illumination for proper inspection.

The conveyor chains 10 are driven by a geared motor 42, which drives through a smaller sprocket 43 a chain 44, a larger sprocket 45 fixed to a shaft 46 on which are mounted a pair of sprockets 16 for driving the conveyor chains 10.

Figure 1:
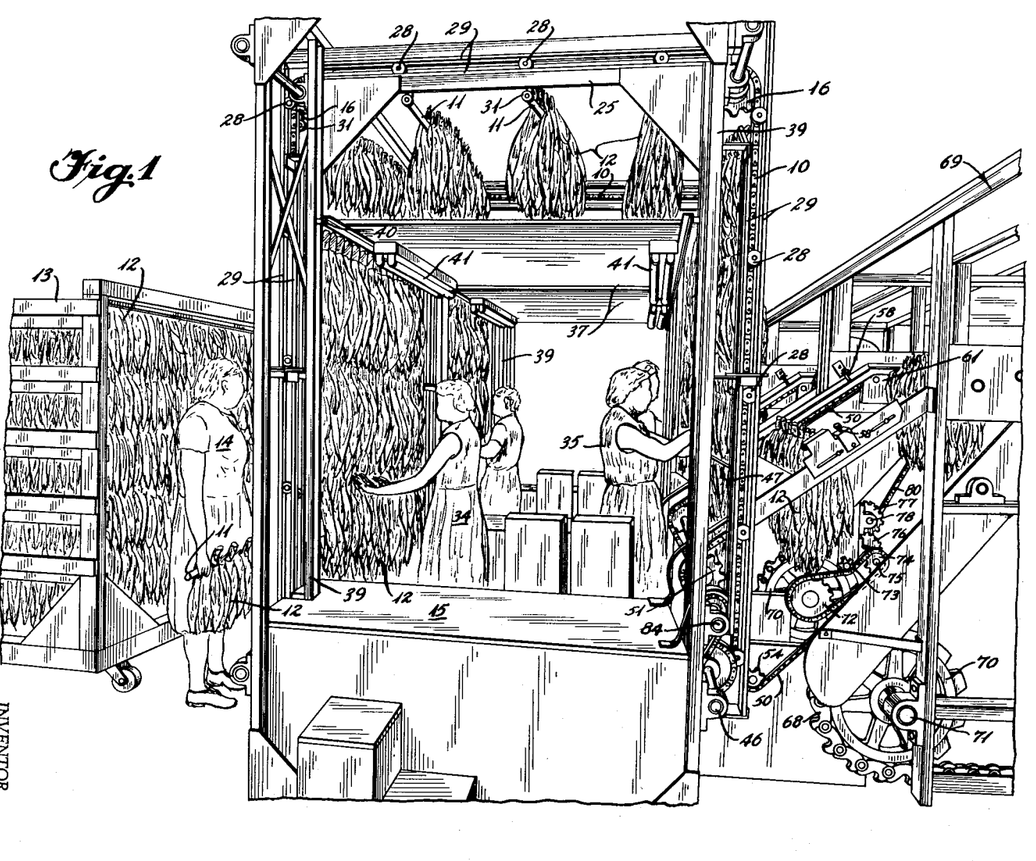
FIG. 1 is a perspective view from one side illustrating one embodiment of the invention in operation.
Figure 2:
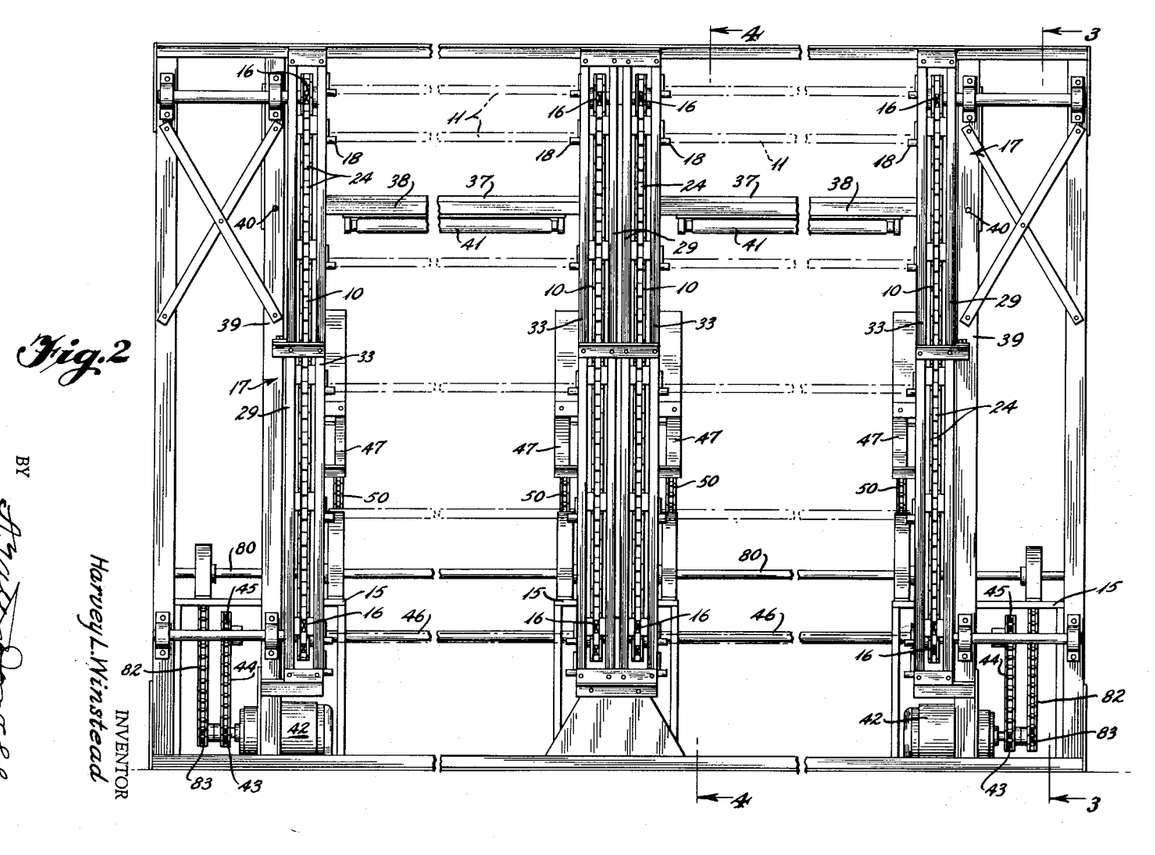
FIG. 2, an elevation of the loading end of the apparatus.
Figure 3:
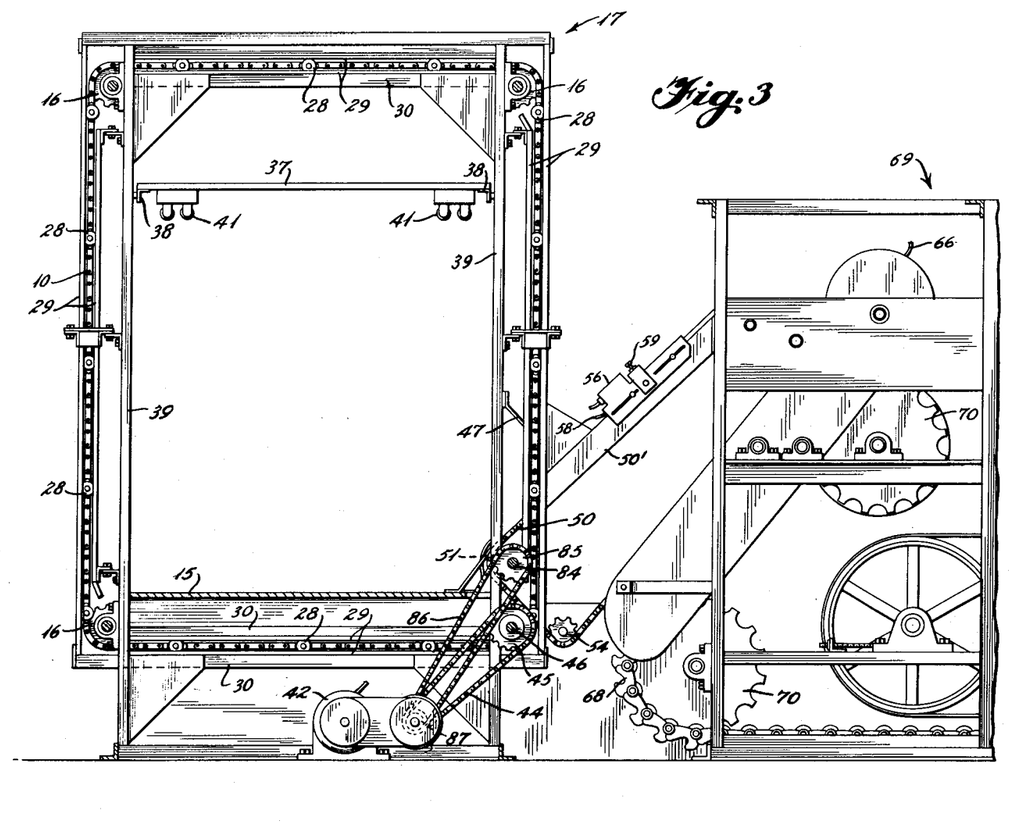
FIG. 3, a horizontal section through the apparatus on the line 3—3 of FIG. 2.
Figure 4:
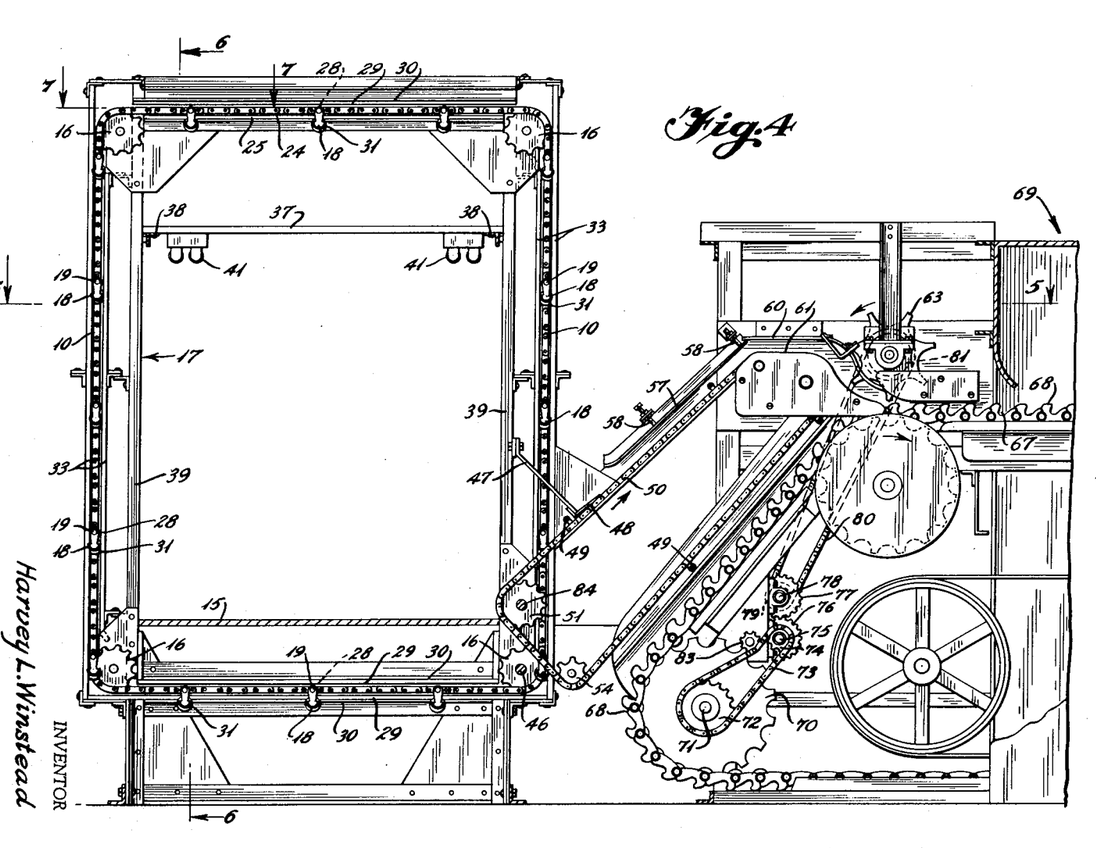
FIG. 4, a vertical section on the line 4—4 of FIG. 2.
Figure 5:
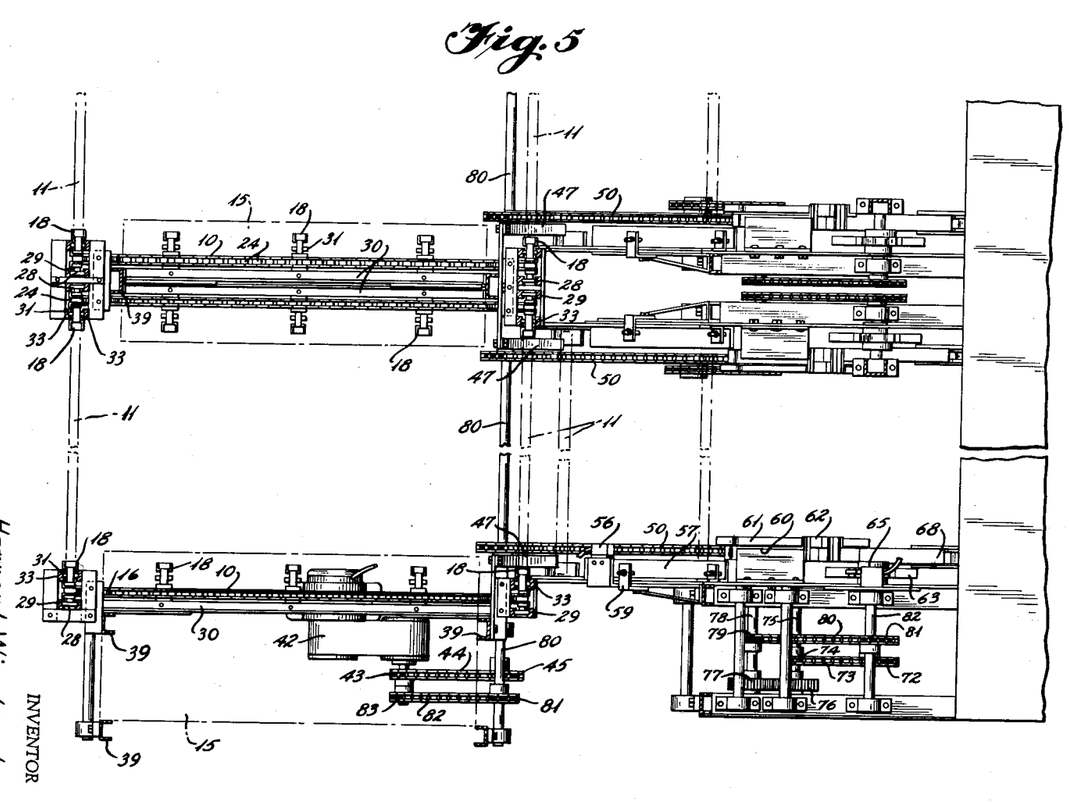
FIG. 5, a horizontal section on the line 5—5 of FIG. 4.
Figure 6:
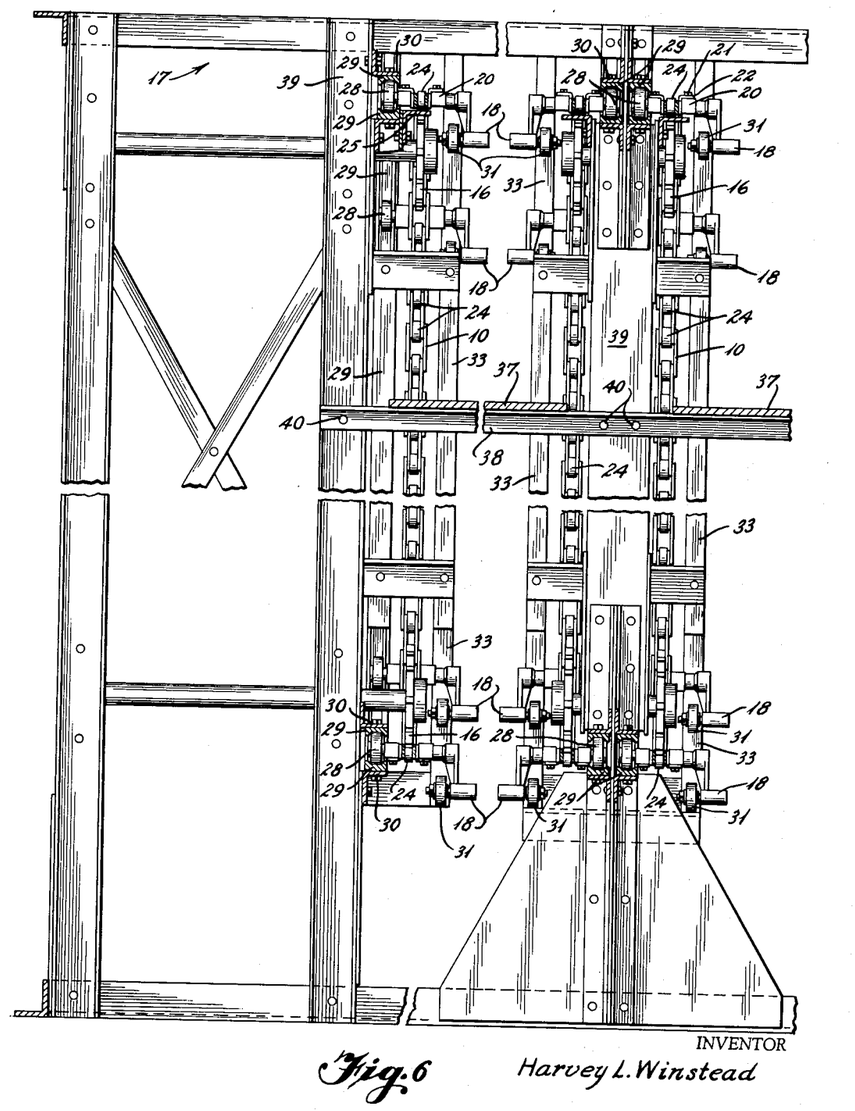
FIG. 6, an enlarged fragmentary vertical section viewed on the line 6—6 of FIG. 4.
Figure 7:
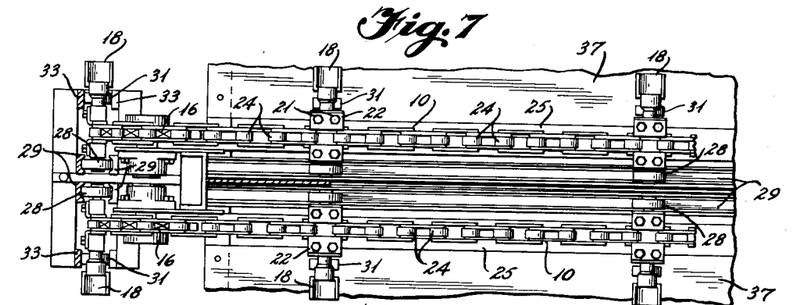
FIG. 7, a fragmentary horizontal section on the line 7—7 of FIG. 4.
Figure 8:
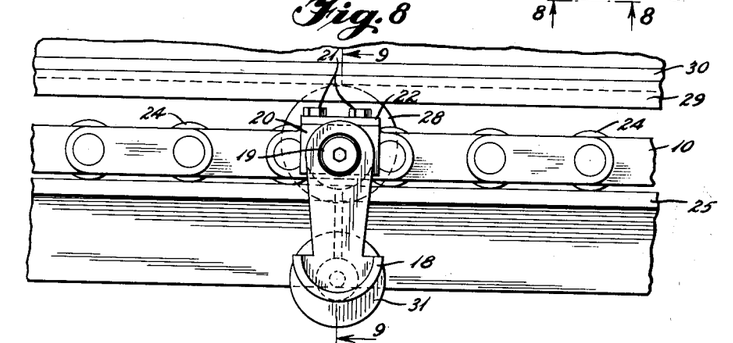
FIG. 8, a side elevation of the conveyor chain and a supporting arm and cup on the line 8—8 of FIG. 7.

As in FIG. 1 two inspection conveyors and redriers are secured together in line and each unit will be controlled by separate geared motors 42 so that each unit will be timed to its individual redrier being driven by its own motor, not shown.

Figure 10:
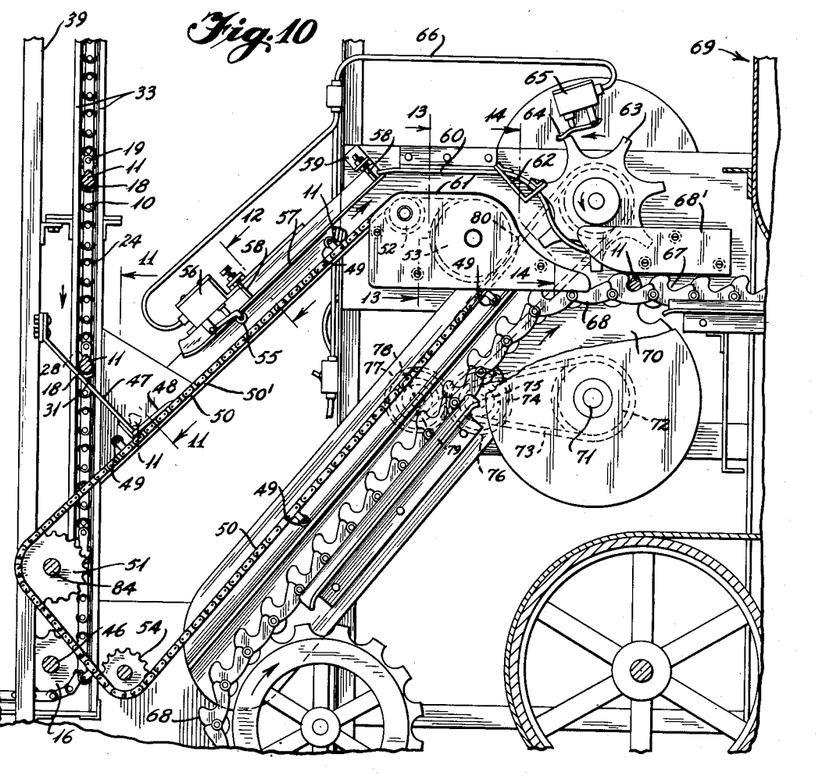
FIG. 10, a vertical section illustrating the relation of the microswitches and the respective conveyors.
Figure 11:
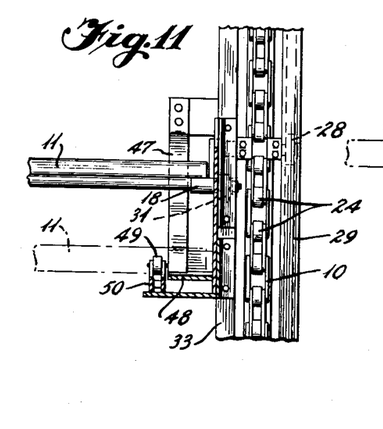
FIG. 11, an enlarged detailed section on the line 11—11 of FIG. 10.
Figure 12:
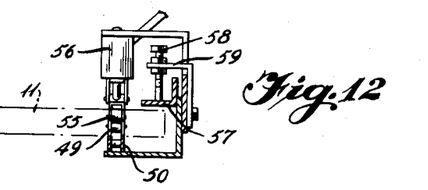
FIG. 12, an enlarged detailed section on the line 12—12 of FIG. 10.
Figures 13, 14, 15, 16:
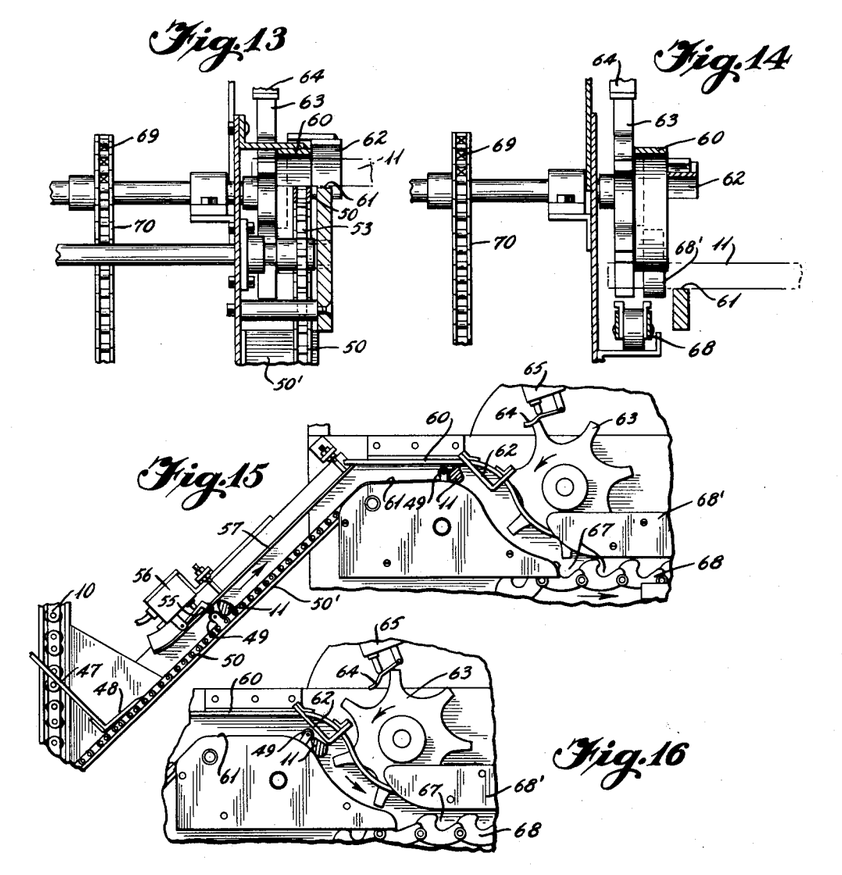
FIG. 13, an enlarged detailed section along the line 13—13 of FIG. 10.
FIG. 14, an enlarged detailed section along the line 14—14 of FIG. 10.
FIGS. 15, 16, 17, operational views illustrating the movement of the stick relative to the conveyor chain.

As the tobacco sticks travel downwardly during the final inspection they will be engaged by spaced transfer arms 47 (FIG. 10) which will cause each engaged stick of tobacco to be ejected from supporting cups 18 and to travel downwardly against spaced stops 48 and subsequently be engaged by spaced followers 49 on the transfer chains 50 supported by angular track members 50' to carry the weight of the stick of tobacco. The transfer chains 50 are driven by drive sprockets 51 and extend over a series of idler sprockets 52, 53 and 54, there being two parallel chains 50 spaced corresponding to but inside of the spacing of the chains which carry the cups 18 so that the sticks of tobacco will be carried up an incline by followers 49 on transfer chains 50 past the contact roller 55 of a microswitch 56 to be described later and beneath guide bars 57 (FIG. 15) adjustable to the width of the sticks 11 to cause a friction on the stick so that they will not rotate or swing due to the leaves of tobacco hanging over and below the stick during travel up the inclined track 50' by means of bolts 58 extending through brackets 59.

Figure 17:
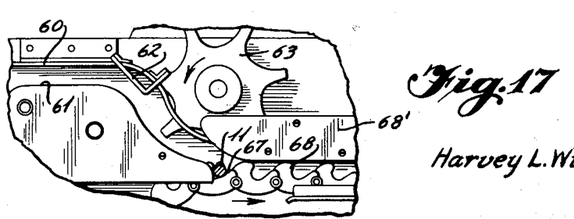

After the sticks of tobacco have traveled to the upper end of the inclined track 50' the top surface of the stick 11 (FIG. 15) will engage a second guide bar 60 preventing the stick from rotating or turning forwardly on its side as it is carried from the inclined track 50' to horizontal position along guide track or bar 61. As stick 11 continues to travel along the horizontal run of the track 61 upon reaching the forward downwardly curved portion of the track, the stick pushed by the followers 49 on transfer chains 50 will start to roll forwardly and downwardly along the curved portion. At this point the forward upper edge of the stick will engage a depending cam 62 which will prevent the stick from rolling over and down the curved portion of the track 61 which would discharge the tobacco therefrom. As the forward upper edge of the stick 11 engages the cam 62 the followers 49 on the transfer chains 50 will urge the rear lower edge of the stick forwardly and down the inclined portion of the track 61 causing the stick 11 to lower into contact with one of the teeth of timing sprocket 63 (FIGS. 15 through 17), which carry the stick down the curved portion of the track 61 and deposit the same in one of the pockets 67 of the chain 68.

The side by side inspection conveyors, and the redriers are driven by individual motors and the movement of the inspection conveyors is independent of the movement of the redrier. For intensive and extended examination the inspection conveyors may be operated at a substantially slower speed than the redrier.

In order to coordinate the spacing of the sticks in time relation so that they may be deposited in one of the sockets 67 of chain 68, a normally closed microswitch 56 is located along the inclined portion of the transfer chain and a second and normally open microswitch 65 is located on the redrier. A tobacco stick moving up the inclined track 50' will engage the follower 55 of the microswitch 56 (FIG. 18) and cause the electrical contact to be broken and to apply the magnetic brake 88 through the magnetic starter 89 and stopping the motor 42.

Figures 9, 18:
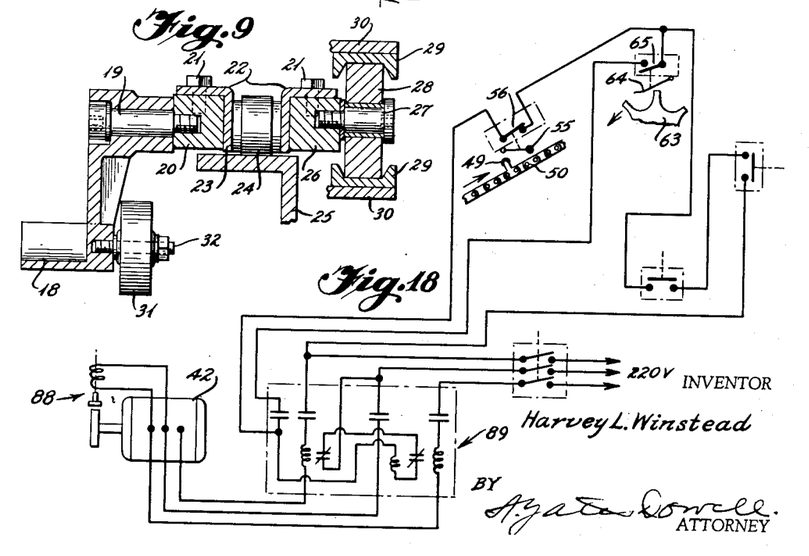
FIG. 9, a vertical section on the line 9—9 of FIG. 8.
FIG. 18, a layout of the electrical wiring system.

In order to override the action of the microswitch 56 the follower 64 of the microswitch 65 will be engaged by one of the teeth on timing sprocket 63 and moved against the contact 66, overriding the action of microswitch 56 and closing the circuit in the magnetic starter 89 to activate the motor 42 and release the magnetic brake 88, causing the stick to continue to travel up the incline and along the horizontal track 61 and down the incline to engage the rear of one of the teeth of the sprocket 63. FIG. 18 is a schematic showing of a main switch and two manually operated switches, all three of which must be closed before the unit will operate. One of the manual switches is located near the front end of the redrier and the second is located near the rear end between the transfer conveyor and redrier. Either one of these manually operated switches will interrupt power to and the movement of the inspection conveyors while the operation of the redrier is not affected. The timing sprocket 63 is so adjusted that whenever a tooth engages the lever 64 and closes the contact 66 it will cause a stick to move forwardly in time relation so that no stick will be wedged between the inclined portion of the track 61 and the teeth of the sprocket 63 to cause jamming of the machine.

With the discharge of a stick of tobacco by the sprocket 63 such stick of tobacco will be received in a recess 67 of a conveyor chain 68 of a conventional redrier 69. A cam surface 68' is provided adjacent to a timing sprocket 63 and directly over chain 68 to cause proper seating of sticks of tobacco in recesses 67 of chains 68. In order to drive the sprocket 63 in the same direction as the conveyor chain 68 and in timed relation thereto as well as to cause the feeding of the sticks of tobacco onto the conveyor of the redrier the chain 68 extends over an idler sprocket 70 fixed to a shaft 71. Also fixed to the same shaft 71 is a smaller or drive sprocket 72 which drives a chain 73 and through which a smaller sprocket 74, fixed to shaft 75, drives a spur gear 76 which in turn drives a second spur gear 77 fastened to a shaft 78. Also on the shaft 78 is a small sprocket 79 driving a chain 80 and through it a larger sprocket 81 fastened to a shaft 82 on which the timing sprocket 63 also is fixed; in order to facilitate the positive driving of such timing sprocket 63, an idler sprocket 83 is provided for removing the slack from the chain 73.

The transfer chains 50 are driven by sprockets 51 fixed to shaft 84 on which shaft also is mounted a sprocket 85 driven by a chain 86 from a smaller sprocket 87 geared to the motor 42. Thus by the motor 42 the inspection conveyor and the transfer conveyor, onto which the tobacco sticks are discharged after the tobacco is inspected, are driven in timed relation to the redrier by means of the controlled timing sprocket 63 and microswitches 65 and 56.

The movement of the inspection conveyors is relatively slow, but is coordinated in timed relation with the speed of the redrier and consequently subject to starting stopping and consequent variations in speed necessary for various reasons. Due to the extreme length of the redrying machine chain there is a certain amount of wear so that the length thereof varies to some degree and the described control of the feed is sufficient to compensate and cause the conveyor and transfer chain to travel in the proper timed relation to the conveyors of the redrying machine. When the speed of the conveyors of the redrying machine is varied, the speed of the timing sprocket will be varied and the operation of the conveyor which feeds the sticks to the drying machine will be stopped, started, or otherwise operated accordingly through the control microswitches 56 and 65.

Tobacco fed to the redrying machine has various percentages of moisture and is subjected to three stages of heating and cooling and a final drying stage. The chains which convey the sticks filled with tobacco and discharge them onto the redrying conveyors are operated by motors with brakes, each unit having one motor and one brake. The motors 42 are geared motors with magnetic brakes 88 in the electrical system controlled through a magnetic starter control 89. A control sprocket 63 driven by the redrier controls the feeding of the sticks of tobacco onto the redrier conveyor. This is accomplished by the rotation of the sprocket 63 contacting the arm of the microswitch 65 which overrides the microswitch 56 and controls the arm 55.

It will be obvious to one skilled in the art that various changes may be made in the invention without departing from the spirit and scope thereof and therefore the invention is not limited by that which is illustrated in the drawings and described in the specification, but only as indicated in the accompanying claims.

What is claimed is:

1. Apparatus for the inspection of tobacco and for the feeding of such tobacco onto a tobacco redrier comprising a frame, a pair of sprockets one above the other at each side of said frame, a second group of similarly arranged sprockets in parallel relation to the first, a pair of parallel chain conveyors one over each group of sprockets, each of said conveyors having spaced depending arms pivoted thereto with cups at their lower ends facing each other and spaced according to the length of a tobacco stick in order to receive and support therebetween a tobacco stick filled with tobacco, means for driving said conveyors in unison, the tobacco sticks being adapted to be applied to the lower portion of the upwardly traveling conveyors to permit inspection of the tobacco on one side of each stick during such upward travel of the same and for inspection of the tobacco on the other side as it travels downwardly along the remote side of the apparatus, a workman's protecting roof mounted on said frame beneath the upper portions of the conveyors, illuminating means for the tobacco beneath and covered by said roof, housing means for the lower return portions of the conveyors, means for transferring sticks of tobacco from the conveyors onto a transfer conveyor and from the transfer conveyor onto a redrier, a motor having a brake for driving the first mentioned conveyors and said means for transferring, a timing sprocket, and multiple microswitches operable subject to the operation of the redrier and said timing sprocket for controlling the operation of said motor.

2. Apparatus for the inspection and loading of sticks of tobacco comprising a frame, opposed groups of vertically and horizontally spaced sprockets on said frame, a pair of conveyor chains mounted in spaced parallel relation one about each group of sprockets with spaced vertical runs connected by upper and lower runs, each of said conveyor chains having spaced depending arms pivoted thereto with cups at their lower ends, the cups on one conveyor chain being disposed towards and spaced similarly to the cups on the spaced parallel conveyor chain whereby one conveyor chain supports one end and the other conveyor chain supports the other end of a tobacco stick, a motor for driving said conveyor chains in unison to cause sticks of tobacco thereon to travel along said vertical and upper runs of said conveyor chains whereby workmen may inspect the tobacco on each stick during the vertical travel thereof, a roof mounted in said frame beneath the upper runs of the conveyor chains and shielding workmen from falling tobacco, illuminating means carried by said roof and illuminating tobacco at each edge of the roof for facilitating the inspection of such tobacco, a housing for each of the lower runs of said conveyor chains, means for transferring sticks of tobacco from said conveyor chains onto a tobacco redrier, means for limiting the turning of the tobacco sticks during such transfer, and means for controlling the operation of said motor and the transfer of the sticks of tobacco to the redrier subject and in accordance with the operation of said redrier.

3. Apparatus for the inspection and loading of tobacco onto a redrier comprising a frame, opposed groups of vertically and horizontally spaced sprockets on said frame, a pair of conveyor chains mounted one about each group of sprockets in spaced parallel relation, each of said conveyor chains having spaced depending arms pivoted thereto with cups at their lower ends, the cups on one conveyor chain extending toward and spaced similarly to the cups on the spaced parallel conveyor chain whereby one conveyor chain supports one end and the other conveyor chain supports the other end of a stick of tobacco, means for driving said conveyor chains in unison, the upright portions of said conveyor chains being adapted to support the sticks of tobacco for inspection of opposite sides of the tobacco on each stick, a workman-protecting roof mounted in said frame beneath the upper connecting portions of the conveyor chains, illuminating means mounted on the under side of said roof, housing means for the lower return portions of said conveyor chains, means for transferring sticks of tobacco from said conveyor chains onto a tobacco redrier, and control means for such transfer subject to the operation of the tobacco redrier.

4. Apparatus for the inspection and loading of tobacco onto a tobacco redrying machine comprising an inspection station including a conveyor system constructed to move sticks of tobacco in a generally U-shaped inverted path upwardly horizontally and downwardly simultaneously exposing both sides of the tobacco to inspection during its travel, means for illuminating the exposed sides of the tobacco as it is moved upwardly and downwardly, means for transferring the sticks of tobacco from said conveyor to a tobacco redrier, and means for controlling such transfer of the sticks of tobacco to the redrier in accordance with the operation of the redrier.

5. Apparatus for the inspection and loading of tobacco onto a redrying machine comprising a conveyor system constructed to move sticks of tobacco upwardly horizontally and downwardly, means for illuminating the tobacco as it is moved upwardly and downwardly whereby undesirable leaves and other substances may be observed and removed simultaneously from both sides of the sticks, means for transferring the sticks of tobacco from said conveyor to a tobacco redrier, and means for controlling such transfer of the sticks of tobacco to the redrier in accordance with the operation of the redrier.

6. Apparatus for supporting sticks with tobacco depending therefrom and for moving the sticks with the tobacco thereon by an inspection area comprising conveyor means, driving means for said conveyor means, means for removing sticks of tobacco from said conveyor means and for feeding such sticks of tobacco onto a tobacco redrier, and control means actuatable by said redrier for controlling the feeding of the sticks of tobacco onto said tobacco redrier.

7. Apparatus for the inspection of material and for the feeding of such material onto another machine comprising a supporting element, a pair of sprockets one above the other at each side of said supporting element, a second group of similarly arranged sprockets in parallel relation to the first, a pair of parallel chain conveyors one over each group of sprockets, each of said conveyors having spaced depending arms pivoted thereto with cups at their lower ends facing each other and spaced according to the length of the material in order to receive and support therebetween a supporting element, means for driving said conveyors in unison, the material being adapted to be applied to the lower portion of the upwardly traveling conveyors to permit inspection of the front and rear sides of the material during such upward travel of the same and for inspection of the material on the front side as it travels downwardly along the remote side of the apparatus, a workman's protecting roof mounted on said frame beneath the upper portions of the conveyors, illuminating means for the material beneath and carried by said roof, housing means for the lower return portions of the conveyors, means for transferring material from the conveyors onto a transfer conveyor and from the transfer conveyor onto the another machine, a motor having a brake for driving the first mentioned conveyor, and said means for transferring, a timing sprocket, and multiple microswitches operable subject to the operation of the other machine and said timing sprocket for controlling the operation of said motor.

8. Apparatus for the inspection and loading of material comprising a frame, opposed groups of vertically and horizontally spaced sprockets on said frame, a pair of conveyor chains mounted in spaced parallel relation one about each group of sprockets with spaced vertical runs connected by upper and lower runs, each of said conveyor chains having spaced depending arms pivoted thereto with cups at their lower ends, the cups on one conveyor chain being disposed towards and spaced similarly to the cups on the spaced parallel conveyor chain whereby one conveyor chain supports one end and the other conveyor chain supports the other end of the material, a motor for driving said conveyor chains in unison to cause material thereon to travel along said vertical and upper runs of said conveyor chains whereby workmen may inspect the material on each stick during the vertical travel thereof, a roof mounted in said frame beneath the upper runs of the conveyor chains and shielding workmen from falling material, illuminating means carried by said roof and illuminating material at each edge of the roof for facilitating the inspection of such material, a housing for each of the lower runs of said conveyor chains, means for transferring material from said conveyor chains onto a second machine, means for limiting the turning of the material during such transfer, and means for controlling the operation of said motor and the transfer of the material to the second machine subject to and in accordance with the operation of the latter.

9. Apparatus for the inspection and loading of material onto a second machine comprising a conveyor system constructed to move material upwardly horizontally and downwardly simultaneously exposing opposite surfaces of the material to inspection during such movement, means for illuminating opposite surfaces of the material as it is moved upwardly and downwardly whereby undesirable portions may be observed and removed, means for transferring the material from said conveyor to the second machine, and means for controlling such transfer of the material to the second machine in accordance with the operation of said second machine.

10. Apparatus for the inspection and loading of material onto moving mechanism comprising a conveyor means for moving the material, supporting means associated with said conveyor means for supporting the material in a manner to expose opposite surfaces and allow full inspection thereof, means for illuminating the material during inspection, means for transferring the material from said conveyor means onto the moving mechanism, and means for controlling such transfer in accordance with the motion of said moving mechanism.

11. Apparatus for the inspection and loading of sticks with leaves of plants thereon onto a machine for the treating of such leaves comprising a pair of generally rectangular conveyors disposed in parallel side by side relation and with similarly located supports for the opposite end of sticks on which such leaves are carried in a manner that the opposite surfaces of such leaves may be examined, means automatically for discharging the sticks with the leaves thereon allowing a lapse of time sufficient to allow for the examination of such leaves, means for transferring the discarded sticks with leaves attached thereto to other apparatus, and for controlling the discharge in accordance with the operation of such apparatus.

References Cited in the file of this patent

UNITED STATES PATENTS

| | | |
|---|---|---|
| 1,220,457 | Reese | Mar. 27, 1917 |
| 1,659,968 | Woodward | Feb. 21, 1928 |
| 1,862,192 | Michaux | June 7, 1932 |
| 2,219,166 | Schaefer | Oct. 22, 1940 |
| 2,260,528 | Levy et al. | Oct. 28, 1941 |
| 2,515,684 | Ambrette | July 18, 1950 |
| 2,606,644 | Saborsky | Aug. 12, 1952 |
| 2,704,158 | Long | Mar. 15, 1955 |
| 2,724,482 | De Francisci | Nov. 22, 1955 |
| 2,741,357 | Surico | Apr. 10, 1956 |